(12) United States Patent
Choi

(10) Patent No.: US 8,890,830 B2
(45) Date of Patent: Nov. 18, 2014

(54) DISPLAY DEVICE-INTEGRATED TOUCH SCREEN PANEL

(71) Applicant: Samsung Display Co., Ltd., Yongin-si (KR)

(72) Inventor: Jae-Woo Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 173 days.

(21) Appl. No.: 13/675,755

(22) Filed: Nov. 13, 2012

(65) Prior Publication Data

US 2014/0028582 A1    Jan. 30, 2014

(30) Foreign Application Priority Data

Jul. 24, 2012    (KR) .................. 10-2012-0080613

(51) Int. Cl.
*G06F 3/041* (2006.01)
*G06F 3/044* (2006.01)

(52) U.S. Cl.
CPC .............. *G06F 3/041* (2013.01); *G06F 3/0412* (2013.01); *G06F 3/044* (2013.01); *G06F 2203/04107* (2013.01)
USPC ............ 345/173; 345/156; 345/174; 345/179

(58) Field of Classification Search
USPC ........................................................ 345/173
See application file for complete search history.

(56) References Cited

U.S. PATENT DOCUMENTS

| 8,188,991 B2* | 5/2012 | Ohhashi et al. ............... 345/204 |
| 2009/0237378 A1* | 9/2009 | Ohhashi et al. ............... 345/204 |
| 2010/0045646 A1* | 2/2010 | Kishi ............................. 345/211 |
| 2010/0072482 A1 | 3/2010 | Eom et al. |
| 2011/0134056 A1 | 6/2011 | Kim et al. |
| 2011/0141084 A1* | 6/2011 | Kishi ............................. 345/211 |
| 2011/0316803 A1 | 12/2011 | Kim |
| 2012/0033168 A1 | 2/2012 | Hwang et al. |
| 2012/0127092 A1 | 5/2012 | Lee |
| 2012/0127095 A1 | 5/2012 | Jun |

FOREIGN PATENT DOCUMENTS

| EP | 2 290 512 A2 | 3/2011 |
| KR | 10-2010-0034876 | 4/2010 |
| KR | 10-1082162 | 11/2011 |
| KR | 10-2012-0001406 | 1/2012 |

OTHER PUBLICATIONS

EPO Search Report dated Oct. 7, 2013, for corresponding European Patent application 12197650.0, (6 pages).

* cited by examiner

*Primary Examiner* — Van Chow
(74) *Attorney, Agent, or Firm* — Christie, Parker & Hale, LLP

(57) ABSTRACT

A display device-integrated touch screen panel including an upper substrate and a lower substrate having a display region and a non-display region outside of the display region and including a first non-display region and a second non-display region at an outer side of the first non-display region, a plurality of sensing patterns on the upper substrate in the display region, a plurality of sensing lines located on the upper substrate in the non-display region, and coupled to the sensing patterns, a first guard ring pattern adjacent an edge of the first non-display region and surrounding the plurality of sensing lines, a sealing material between the upper substrate and the lower substrate in the non-display region, and a second guard ring pattern overlapping the sealing material in the non-display region, the second guard ring pattern being electrically coupled to the first guard ring pattern and including a transparent conductive material.

18 Claims, 4 Drawing Sheets

DISPLAY DEVICE-INTEGRATED TOUCH SCREEN PANEL

CROSS-REFERENCE TO RELATED APPLICATION

This application claims priority to and the benefit of Korean Patent Application No. 10-2012-0080613, filed on Jul. 24, 2012, in the Korean Intellectual Property Office, the entire content of which is incorporated herein by reference.

BACKGROUND

1. Field

Embodiments of the present invention relate to a display device.

2. Description of the Related Art

A touch screen panel is an input device capable of inputting a user's instruction by selecting content displayed on a screen of an image display device, or the like, with the user's hand or an object, such as a stylus.

To this end, the touch screen panel is located on a front surface of the image display device to use a contact position of the human hand or the object to produce an electric signal. Therefore, the content selected at the contact position is recognized as an input signal.

Since the touch screen panel may replace a separate input device connected to the image display device, such as a keyboard or a mouse, application of touch screen panels has been gradually extended.

As types of touch screen panels, a resistive-type touch screen panel, a photosensitive-type touch screen panel, a capacitive-type touch screen panel, and the like, have been known. Among them, the capacitive-type touch screen panel senses a change in capacitance between a conductive sensing pattern and a neighboring sensing pattern, ground electrode, or the like, when a human hand or an object contacts the touch screen panel, thereby producing an electrical signal corresponding to a contact position.

In general, the touch screen panel is separately manufactured and attached to the image display device, such as a liquid crystal display device or an organic light emitting display device. However, when a separately manufactured touch screen is attached to the display device, the entire thickness of a product is increased and manufacturing cost is also increased.

In addition, in the touch screen panel having the structure of the prior art as described above, a malfunction or damage to internal circuits may occur due to electrostatic discharge generated during manufacturing, transferring, or using the product.

SUMMARY

An aspect of embodiments of the present invention is to provide a display device-integrated touch screen panel in which a touch screen panel is directly formed on an upper substrate of a display device, wherein a first guard ring pattern is formed in a first non-display region of the touch screen panel, and a second guard ring pattern made of a transparent conductive material and coupled to the first guard ring pattern is formed in a second non-display region where a sealing material for sealing upper and lower substrates of the display device is applied, thereby making it possible to reduce an overall thickness of the display device, improve visibility of images, and reduce or minimize an effect of electrostatic discharge applied from the outside more efficiently.

To achieve the above, there is provided a display device-integrated touch screen panel including an upper substrate, a lower substrate, the upper substrate and the lower substrate having a display region and a non-display region at an outer side of the display region and including a first non-display region and a second non-display region at an outer side of the first non-display region, a plurality of sensing patterns on the upper substrate in the display region, a plurality of sensing lines located on the upper substrate in the non-display region, and coupled to the sensing patterns, a first guard ring pattern adjacent an edge of the first non-display region and surrounding the plurality of sensing lines, a sealing material between the upper substrate and the lower substrate in the non-display region, and a second guard ring pattern overlapping the sealing material in the non-display region, the second guard ring pattern being electrically coupled to the first guard ring pattern and including a transparent conductive material.

The sensing lines and the first guard ring pattern may include a low resistance material.

The display device-integrated touch screen panel may further include an insulating layer on the upper substrate, and the second guard ring pattern may contact the insulating layer in the non-display region, and may directly contact the first guard ring pattern through a contact hole in the insulating layer above the first guard ring pattern.

The display device-integrated touch screen panel may further include a third guard ring pattern at an edge of the second non-display region and surrounding an area above the sealing material.

The third guard ring pattern may include a low resistance metal material.

The display device-integrated touch screen panel may further include an insulating layer on the upper substrate, and the second guard ring pattern may contact the insulating layer in the non-display region, and may directly contact the third guard ring pattern through a contact hole in the insulating layer above the third guard ring pattern.

The sensing patterns may include first sensing cells coupled to each other for each row line in a first direction, first connecting ones coupling the first sensing cells in the first direction, second sensing cells coupled to each other for each column line in a second direction, and second connecting lines coupling the second sensing cells in the second direction.

The sensing patterns may be at a same layer.

The sensing cells and the second connecting lines may be integrally formed.

The display device-integrated touch screen panel may further include an insulating layer located at crossing regions of the first connecting lines and the second connecting lines.

The sensing patterns may be at an outer surface of the upper substrate.

The upper substrate may include a sealing substrate of the organic light emitting display device.

The display device-integrated touch screen panel may further include a polarizing film attached to the upper substrate on which the sensing patterns, the sensing lines, and the first and second guard ring patterns are formed, and a window substrate attached to the polarizing film.

The display device-integrated touch screen panel may further include a black matrix layer on the window substrate and corresponding to the non-display region.

The polarizing film may include a polarizer, a phase difference compensating layer, and a transparent adhesive for supporting the polarizer and for attaching the phase difference compensating layer to the polarizer.

The display device-integrated touch screen panel may be flexible.

The window substrate may include at least one of Polymethyl Methacrylate, (PMMA), acryl, or polyester (PET).

BRIEF DESCRIPTION OF THE DRAWINGS

The accompanying drawings, together with the specification, illustrate exemplary embodiments of the present invention, and, together with the description, serve to explain aspects of embodiments of the present invention.

DETAILED DESCRIPTION

Figure 1:
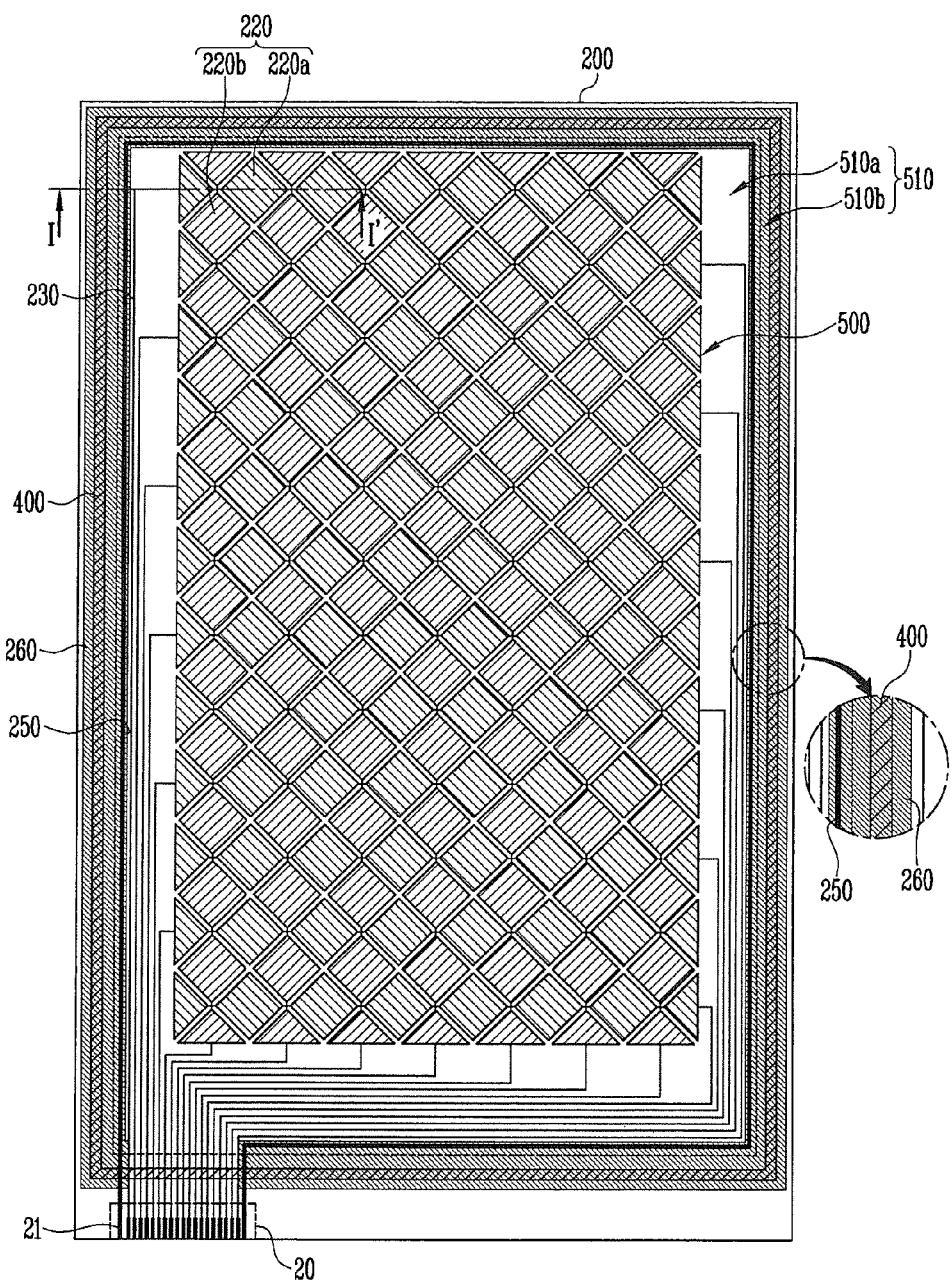
FIG. 1 is a plan view showing an upper substrate of a display device-integrated touch screen panel according to an exemplary embodiment of the present invention.

In the following detailed description, only certain exemplary embodiments of the present invention have been shown and described, simply by way of illustration. As those skilled in the art would realize, the described embodiments may be modified in various ways, all without departing from the spirit or scope of the present invention. Accordingly, the drawings and description are to be regarded as illustrative in nature, and not restrictive. In addition, when an element is referred to as being "on" another element, it can be directly on the another element, or can be indirectly on the another element with one or more intervening elements interposed therebetween. Also, when an element is referred to as being "connected to" or "coupled to" another element, it can be directly coupled to the another element, or can be indirectly coupled to the another element with one or more intervening elements interposed therebetween. Hereinafter, like reference numerals refer to like elements.

Hereinafter, exemplary embodiments of the present invention will be described in detail with reference to the accompanying drawings.

Figure 2:
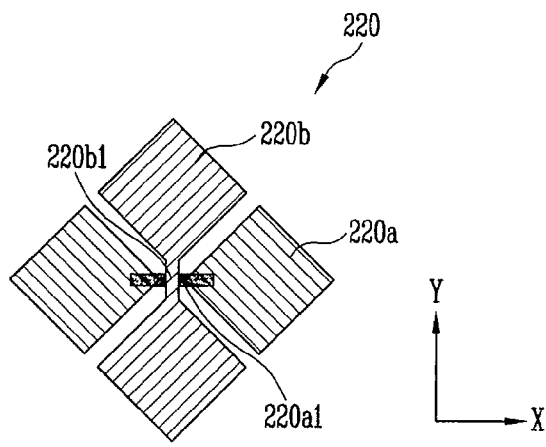
FIG. 2 is an enlarged view showing a part of a sensing pattern of the embodiment shown in FIG. 1.

FIG. 1 is a plan view showing an upper substrate of a display device-integrated touch screen panel according to an exemplary embodiment of the present invention, and FIG. 2 is an enlarged view showing a part of a sensing pattern of the embodiment shown in FIG. 1.

Exemplary embodiments of the present invention are directed to a display device-integrated a touch screen panel, in which the touch screen panel is formed directly on a surface of an upper substrate 200 of the display device.

Here, a surface of the upper substrate 200 corresponds to an outer surface of the upper substrate. That is, FIG. 1 is a plan view showing the outer surface of the upper substrate of the display device according to the present exemplary embodiment of the present invention.

However, FIG. 1 shows only an exemplary embodiment of the present invention, and the present invention is not limited thereto. That is, the touch screen panel may be formed on an inner surface of the upper substrate 200, or first sensing cells 220a forming sensing patterns 220 of the touch screen panel may be formed on the inner surface of the upper substrate 200, and second sensing cells 220b may be alternately arranged to not overlap the first sensing cells 220a and may be formed on the outer surface of the upper substrate 200.

In addition, the display device may be an organic light emitting display device or a liquid crystal display device. In the present exemplary embodiment of the present invention, an organic light emitting display device will be described.

Therefore, the upper substrate 200 may be made of a transparent material, for example, a sealing substrate of the organic light emitting display device. However, if the organic light emitting display device is flexible, the upper substrate 200 may be made of a film material (for example, polyimide material) or of a plurality of thin film layers.

In addition, as shown in FIG. 1, the touch screen panel according to the present exemplary embodiment includes sensing patterns 220 formed at a top surface of the upper substrate 200 (the transparent substrate serving as the sealing substrate), and sensing lines 230 coupling the sensing patterns 220 to an outer driving circuit (now shown) through a bonding pad part 20.

Here, a region in which the plurality of sensing patterns 200 are formed to detect a touch position is a display region 500 in which an image is displayed, and a region at the outer side of the display region 500 in which sensing lines 230 electrically coupled to the sensing patterns 220 and the bonding pad part 20 are formed is a non-display region 510.

In addition, in the present exemplary embodiment, the non-display region 510 is divided into a first non-display region 510a, in which the sensing lines 230 are formed, and a second non-display region 510b positioned at the outer side of the first non-display region 510a (e.g., to surround the first non-display region 510a). In the second non-display region 510b, the bonding pad part 20 having a plurality of pads 21 coupled to each of the sensing lines 230 is formed.

Here, the second non-display region 510b is a region where a sealing material 400 is applied between the upper substrate 200 and a lower substrate 100 to bond the upper substrate 200 and the lower substrate 100. Through curing of the sealing material 400 by laser irradiation to the second non-display region 510b, the upper substrate 200 and the lower substrate 100 are bonded together.

In addition, as shown in FIG. 1, the touch screen panel according to the present exemplary embodiment may have a first guard ring pattern 250 at an edge of the first non-display region 510a to enclose (e.g., surround) the outer side of the sensing lines 230, and the first guard ring pattern 250 may be coupled to a pad (e.g., among the bonding pads 21 included in the bonding pad part 20) that is coupled to a ground power supply GND.

The first guard ring pattern 250 may be made of the same material as that of the sensing lines 230, for example, a low resistance metal material, and serves to avoid or prevent a malfunction or damage to internal circuits of the touch screen panel due to externally applied electrostatic discharge.

However, to increase the size of the display region 500 in which an image display and touch sensing are performed, the non-display region 510 positioned at the outer side of the display region 500 should have a narrower width, accordingly.

To reduce or minimize an effect of electrostatic discharge (ESD) applied from the outside, the guard ring pattern 250 needs to be sufficiently wide. However, as described above, to decrease the width of the non-display region 510, the width of the guard ring pattern 250 should also become narrow.

In addition, when the width of the guard ring pattern 250 is increased to avoid or prevent deterioration due to ESD, the guard ring pattern 250 overlaps the sealing material 400 applied to the second non-display region 510b. In this case, during process of curing of the sealing material 400 by laser, the sealing material 400 is not sufficiently cured in the region in which the sealing material 400 overlaps the guard ring pattern 250, such that a bonding defect may be generated.

In the present exemplary embodiment, to avoid or overcome this curing issue, a second guard ring pattern 260, which is made of a transparent conductive material and is coupled to the first guard ring pattern 250, is formed in the second non-display region 510b in which the sealing material 400 is applied, such that the disadvantage of the sealing material 400 being insufficiently cured is overcome, and both the guard ring patterns 250 and 260 are sufficiently wide, thereby making it possible to reduce or minimize the effect of the electrostatic discharge (ESD) applied from the outside.

A structure of the touch screen panel according to the present exemplary embodiment will be described in detail with reference to FIGS. 1 and 2.

The sensing patterns 220 include a plurality of first sensing cells 220a coupled to each other for each row line in a first direction (e.g., X-axis direction), first connecting lines 220a1 coupling the first sensing cells 220a, second sensing cells 220b coupled to each other for each column line in a second direction (e.g., Y-axis direction), and second connecting lines 220b1 coupling the second cells 220b to each other, as shown in FIG. 2.

The first and second sensing cells 220a and 220b are alternately disposed to not overlap each other, and the first and second connecting lines 220a1 and 220b1 cross each other. Here, the first and second connecting lines 220a1 and 220b1 have an insulating layer (not shown) interposed therebetween to secure stability.

Meanwhile, the first and second sensing cells 220a and 220b may be formed integrally with the first and second connecting lines 220a1 and 220b1, respectively, using a transparent conductive material such as indium tin oxide (ITO), or may be formed separately from the first and second connecting lines 220a1 and 220b1 and then electrically coupled thereto, respectively.

For example, the second sensing cells 220b may be patterned integrally with the second connecting lines 220b1 in the second direction, and the first sensing cells 220a may be patterned to each have an independent pattern between the second sensing cells 220b and may be coupled to each other in the first direction by the first connecting lines 220a1 positioned at an upper or lower portion thereof.

Here, the first connecting lines 220a1 may directly contact the first sensing cells 220a at an upper or lower portion of the first sensing cells 220a to thereby be electrically coupled thereto, or may be electrically coupled to the first sensing cells 220a through contact holes, or the like.

The first connecting lines 220a1 may be made of the transparent conductive material such as ITO, or may be made of an opaque low resistance metal material and may have an adjustable width, or the like, to avoid or prevent visualization of the pattern (e.g., to make the pattern less noticeable).

The sensing lines 230 are coupled to the first sensing cells 220a in a row unit and the second sensing cells 220b in a column unit to respectively couple the first and second cells 220a and 220b to the external driving circuit (not shown) such as, for example, a position detecting circuit through the bonding pad part 20. The sensing lines 230, which are located in the first non-display region 510a positioned at an outer side portion of the display region 500 in which an image is displayed, may be made of a wide range of materials. That is, the sensing lines 230 may be made of a low resistance metal material such as molybdenum (Mo), silver (Ag), titanium (Ti), copper (Cu), aluminum (Al), molybdenum/aluminum/molybdenum (Mo/Al/Mo), and the like, in addition to the transparent electrode material used to form the sensing patterns 220.

In the touch screen panel according to the present exemplary embodiment (for example, a capacitive-type touch panel), when a contact object such as a human hand, a stylus pen, or the like, contacts the touch panel, a change in capacitance according to a contact position is transferred from the sensing patterns 220 to the driving circuit (not shown) via the sensing lines 230 and the bonding pad part 20. In this case, the change in capacitance is converted into an electrical signal by X and Y input processing circuits, or the like (not shown), such that the contact position is recognized.

Figure 3:
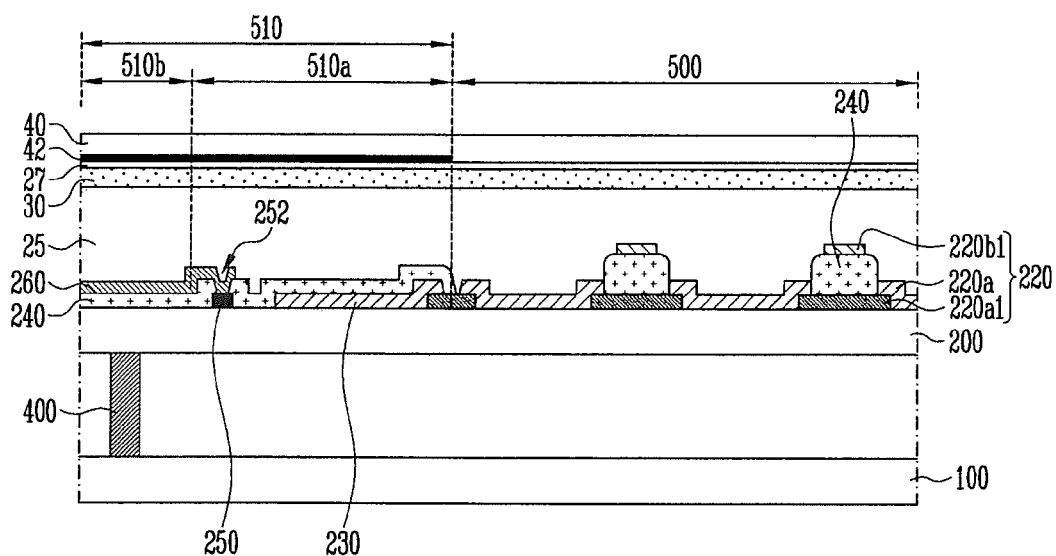
FIG. 3 is a cross sectional view taken along the line I-I' of the display device-integrated touch screen panel according to the exemplary embodiment shown in FIG. 1.

FIG. 3 is a cross sectional view showing a region I-I' of the display device-integrated touch screen panel according to the exemplary embodiment shown in FIG. 1, and the region corresponding to the line I-I' indicates portions of the first and second non-display regions 510a and 510b and the display region 500.

Referring to FIG. 3, the sensing patterns 220 formed at the display region of the upper substrate 200 include first sensing cells 220a coupled to each other for each row line in the first direction, first connecting lines 220a1 coupling the first sensing cells 220a to each other in a row direction, second sensing cells 220b coupled to each other for each column line in the second direction, and second connecting lines 220b1 coupling the second sensing cells 220b to each other in the second direction, and also include an insulating layer 240 located at crossing regions of the first connecting lines 220a1 and the second connecting lines 220b1.

However, although dimensions of components of the touch screen panel (such as sensing patterns 220, and the like) in FIG. 3 are exaggerated (e.g., significantly thinner) for convenience of explanation, an actual thickness of the of each component is thinner than that shown in FIG. 3.

Formed in the non-display region 510a of the upper substrate 200 positioned at the outer side of the display region 500 are sensing lines 230, which are electrically coupled to the sensing patterns 220, and the first guard ring pattern 250 enclosing the outer side of the sensing lines 230. Also, the insulating layer 240 is formed over entire surfaces of the sensing lines 230 and the first guard ring pattern 250.

In addition, at a bottom of the second non-display region 510b the sealing material 400 is formed to bond the upper substrate 200 and the lower substrate 100 of the display device.

Here, the lower substrate 100 has a plurality of pixels (not shown) including an organic light emitting device, a thin-film transistor, or the like, formed at the display region 500, signal (e.g., scan signal, data signal) lines coupled to the pixels and providing signals (e.g., predetermined scan signals, data signals, or the like) are formed in the first non-display region 510a, and the sealing material 400 is formed in the second non-display region 510b.

In the present exemplary embodiment, the second guard ring pattern 260, which is made of a transparent conductive material and is coupled to the first guard ring pattern 250, is formed at the second non-display region 510b in which the sealing material 400 is formed.

As shown in FIG. 3, the second guard ring pattern 260 made of the transparent conductive material is formed on the insulating layer 240 of the second non-display region 510b and directly contacts the first guard ring pattern 250 through a contact hole 252 formed at a portion of the insulating layer 240 overlapping the first guard pattern 250.

That is, in the above-mentioned structure, laser may penetrate the second guard ring pattern 260 formed in the region overlapping the sealing material 400, thereby avoiding the disadvantage of the sealing material 400 not being sufficiently cured when the upper and lower substrates are bonded, and a sufficient width is also achieved for both the guard ring patterns 250 and 260, thereby making it possible to reduce or minimize the effect of the electrostatic discharge (ESD) applied from the outside. However, although the structure in which the second guard ring pattern 260 is formed on the insulating layer 240 and the first guard ring pattern 250 beneath the insulating layer 240 is described in the present exemplary embodiment shown in FIG. 3, the present invention is not limited thereto. That is, the second guard ring pattern may be formed beneath the insulating layer, and may be electrically coupled to the first guard ring pattern through a contact hole formed at a portion of the insulating layer overlapping (e.g., above) the second guard ring pattern.

In addition, in the present exemplary embodiment, to improve problems of visualization and reflection characteristics of the sensing patterns that may occur due to forming the touch screen panel directly on the upper substrate 100 of the display device, a polarizing film 30 may be further formed on the top surface of the touch screen panel. That is, in the present exemplary embodiment, the touch screen panel may be between the display device and the polarizing film 30, thereby making it possible to avoid or prevent visualization of, and reduce or minimize the reflectivity of, the sensing patterns. However, when the display device is implemented as the flexible organic light emitting display device, the polarizing film 30 will also be flexible. To this end, the polarizing film 30 according to the present exemplary embodiment may have a structure in which a supporting layer made of a triacetyl cellulose (TAC) material included in the existing polarizing plate is removed, and a polarizer, a transparent adhesive layer, and a phase difference compensating layer are stacked, thereby making it possible to make polarizing film 30 flexible, that is, having a high flexural property.

Generally, the existing polarizing plate has a structure in which the polarizer is interposed between upper and lower supporting layers. The polarizer, which serves to control an amount of light transmitted according to a degree of polarity of incident light, may be made of a poly vinyl alcohol material (PVA). For example, the polarizer may polarize light by elongating the PVA film absorbing iodine with a strong tension.

In addition, the supporting layers provided at upper and lower portions of the polarizer may be made of triacetyl cellulose (TAC) to protect and support the PVA film.

The polarizing plate is generally attached to the outer side of the image display device to improve outdoor visibility by preventing reflection of external light, and so forth. In the case in which the touch screen panel is attached to the upper portion of the image display device, the polarizing plate may be attached to an outer surface of the touch screen panel.

However, if the polarizing plate and the touch screen panel are separately manufactured and then bonded or assembled together, disadvantages, such as a reduction in process efficiency, a reduction in yield, or the like, may occur.

Particularly, in the case of the polarizing plate having the stack structure as described above, the polarizer is about 20 μm thick, the upper supporting layer is about 20 μm thick, and the lower supporting layer is about 80 μm thick. That is, the polarizing plate has an overall thickness of about 180 μm. Therefore, when the polarizing plate is attached to the touch screen panel in the above mentioned state, the overall thickness of the touch screen panel is undesirably increased.

Further, since TAC, which is the material of the supporting layers, has a high elastic modulus, when the polarizing plate having the supporting layers are attached to the flexible touch screen panel, the flexural property of the flexible touch screen panel may not be achieved.

Therefore, in the present exemplary embodiment, to overcome the above-mentioned disadvantages, the supporting layers provided to the existing polarizing plate is removed, and the polarizer is protected and supported by the transparent adhesive layer, thereby making it possible that the polarizing film 330 is flexible.

In addition, to improve the strength of the device, a window substrate 40 may further be provided on the top surface of the polarizing film 30.

As shown in FIG. 3, a black matrix layer (decoration layer) 42 is formed at a region of the window substrate 40 in the non-display region 510. The black matrix layer 42 forms/corresponds to an edge of the display region and may prevent visibility of patterns of sensing lines 230, and the like, formed in the non-display region 510. However, if the display device and the touch screen panel are flexible, as described above, the window substrate 40 may be made of a flexible material.

Therefore, according to the present exemplary embodiment, the window substrate 40 may be made of a material such as polymethylmethacrylate (PMMA), acryl, polyester (PET), or the like, and may have a thickness of about 0.7 mm.

In addition, the polarizing plate 30 and the window substrate 40 may be attached to a first surface of the upper substrate 100, on which sensing patterns and the like are formed, by first and second transparent adhesive layers 25 and 27 interposed between the first surface and the polarizing plate 30, and between the polarizing plate 30 and the window substrate 40, respectively, and the first and second transparent adhesive layer 25 and 27 may be made of a transparent adhesive material, for example a super view resin (SVR) or an optical cleared adhesive (OCA), or the like.

Figure 4:
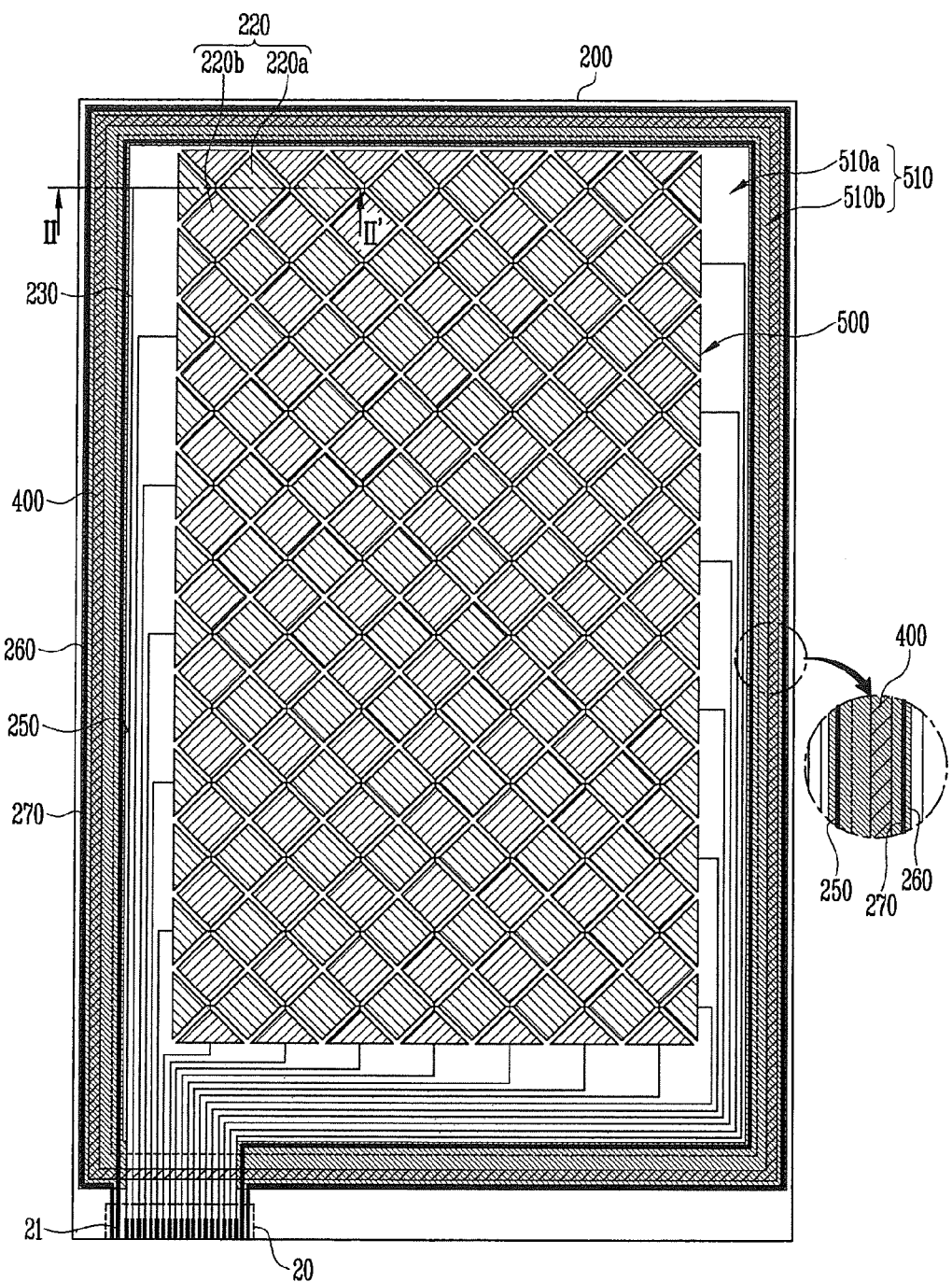
FIG. 4 is a plan view showing an upper substrate of a display device-integrated touch screen panel according to another exemplary embodiment of the present invention.
Figure 5:
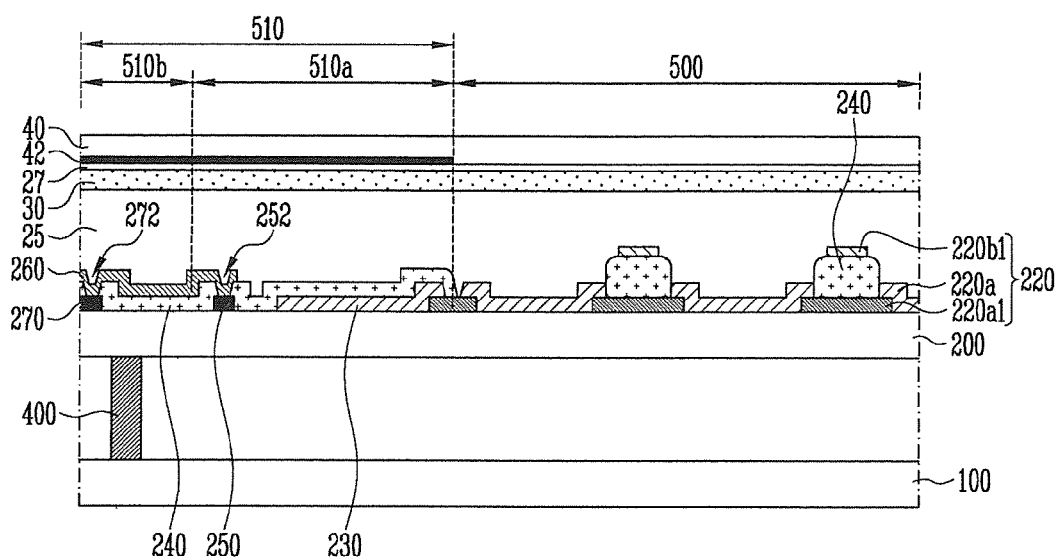
FIG. 5 is a cross sectional view taken along the line II-II' of the display device-integrated touch screen panel according to the exemplary embodiment shown in FIG. 4.

FIG. 4 is a plan view showing an upper substrate of a display device-integrated touch screen panel according to another exemplary embodiment of the present invention, and FIG. 5 is a cross sectional view showing a region corresponding to the line II-II' of the display device-integrated touch screen panel according to the exemplary embodiment shown in FIG. 4.

The exemplary embodiment shown in FIGS. 4 and 5 is different from the exemplary embodiment shown in FIGS. 1 and 3, in that the exemplary embodiment shown in FIGS. 4 and 5 further has a third guard ring pattern 270 made of the same material as a first guard ring pattern 250 in an upper region of a second display region corresponding to a sealing material 400 formed on a bottom surface of a second non-display region 510b of an upper substrate 200, but all components of the exemplary embodiment shown in FIGS. 4 and 5 other than the third guard ring pattern are the same as those of the exemplary embodiment shown in FIGS. 1 and 3. Therefore, like reference numerals will be used to describe same components, and a detailed description thereof will be omitted.

That is, referring to FIGS. 4 and 5, in the present exemplary embodiment, to enhance the ESD-protective characteristic through guard ring patterns, the second guard ring pattern 260, which is electrically coupled to the first guard ring pattern 250 and made of the transparent conductive material, is formed in the second non-display region 510b in which the sealing material 400 is applied, and is also electrically coupled to the third guard ring pattern 270 that is formed in the second non-display region 510b at an outer side portion of the sealing material 400 while not overlapping the sealing material 400, so as to enclose the sealing material 400 (e.g., the 3$^{rd}$ guard ring pattern 270 surrounds a region located above the sealing material 400).

However, the third guard ring pattern 270 is formed through the same process as that of the first guard ring pattern 250, and is made of the same low resistance metal material as that of the first guard ring pattern 250 and the sensing lines 230.

Therefore, as shown in FIG. 5, the second guard ring pattern 260 made of the transparent conductive material is formed on an insulating layer 240 of the second non-display region 510b, and is electrically coupled to the first guard ring pattern 250 and the third guard ring pattern 270 through first and second contact holes 252 and 272, respectively. The first and second contact holes 252 and 272 are respectively formed at areas where the insulating layer 240 overlaps the first guard ring pattern 250 and the third guard ring pattern 270.

That is, through the above-mentioned structure, laser may keep or penetrate the second guard ring pattern 260 formed in the region overlapping the sealing material 400, such that the disadvantage of the sealing material 400 being insufficiently cured at the time of bonding the upper and lower substrates is overcome, and both the guard ring patterns 250 and 260 are sufficiently wide, thereby making it possible to reduce or minimize the effect of the electrostatic discharge (ESD) applied from the outside.

As set forth above, according to exemplary embodiments to the present invention, in the touch screen panel directly formed on the upper substrate of the display device, a first guard ring pattern is formed in a first non-display region of the touch screen panel, and a second guard ring pattern made of a transparent conductive material and coupled to the first guard ring pattern is formed in a second non-display region, a sealing material sealing upper and lower substrates of the display device being applied to the second non-display region, thereby making it possible to reduce an overall thickness of the display device, improve visibility of images, and reduce or minimize an effect of electrostatic discharge applied from the outside more efficiently.

While embodiments of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device-integrated touch screen panel comprising:
   an upper substrate;
   a lower substrate, the upper substrate and the lower substrate having:
      a display region; and
      a non-display region at an outer side of the display region and comprising a first non-display region and a second non-display region at an outer side of the first non-display region;
   a plurality of sensing patterns on the upper substrate in the display region;
   a plurality of sensing lines located on the upper substrate in the non-display region, and coupled to the sensing patterns;
   a first guard ring pattern adjacent an edge of the first non-display region and surrounding the plurality of sensing lines;
   a sealing material between the upper substrate and the lower substrate in the non-display region; and
   a second guard ring pattern overlapping the sealing material in the non-display region, the second guard ring pattern being electrically coupled to the first guard ring pattern and comprising a transparent conductive material.

2. The display device-integrated touch screen panel according to claim 1, wherein the sensing lines and the first guard ring pattern comprise a low resistance material.

3. The display device-integrated touch screen panel according to claim 1, further comprising an insulating layer on the upper substrate,
   wherein the second guard ring pattern contacts the insulating layer in the non-display region, and directly contacts the first guard ring pattern through a contact hole in the insulating layer above the first guard ring pattern.

4. The display device-integrated touch screen panel according to claim 1, further comprising a third guard ring pattern at an edge of the second non-display region and surrounding an area above the sealing material.

5. The display device-integrated touch screen panel according to claim 4, wherein the third guard ring pattern comprises a low resistance metal material.

6. The display device-integrated touch screen panel according to claim 4, further comprising an insulating layer on the upper substrate,
   wherein the second guard ring pattern contacts the insulating layer in the non-display region, and directly contacts the third guard ring pattern through a contact hole in the insulating layer above the third guard ring pattern.

7. The display device-integrated touch screen panel according to claim 1, wherein the sensing patterns comprise:
   first sensing cells coupled to each other for each row line in a first direction;
   first connecting lines coupling the first sensing cells in the first direction;
   second sensing cells coupled to each other for each column line in a second direction; and
   second connecting lines coupling the second sensing cells in the second direction.

8. The display device-integrated touch screen panel according to claim 7, wherein the sensing patterns are at a same layer.

9. The display device-integrated touch screen panel according to claim 8, wherein the sensing cells and the second connecting lines are integrally formed.

10. The display device-integrated touch screen panel according to claim 9, further comprising an insulating layer located at crossing regions of the first connecting lines and the second connecting lines.

11. The display device-integrated touch screen panel according to claim 7, wherein the sensing patterns are at an outer surface of the upper substrate.

12. The display device-integrated touch screen panel according to claim 1, wherein the upper substrate comprises a sealing substrate of an organic light emitting display device.

13. The display device-integrated touch screen panel according to claim 1, further comprising:
   a polarizing film attached to the upper substrate on which the sensing patterns, the sensing lines, and the first and second guard ring patterns are formed; and
   a window substrate attached to the polarizing film.

14. The display device-integrated touch screen panel according to claim 13, further comprising a black matrix layer on the window substrate and corresponding to the non-display region.

15. The display device-integrated touch screen panel according to claim 13, wherein the polarizing film comprises:

a polarizer;

a phase difference compensating layer; and a transparent adhesive for supporting the polarizer and for attaching the phase difference compensating layer to the polarizer.

16. The display device-integrated touch screen panel according to claim 15, wherein the display device-integrated touch screen panel is flexible.

17. The display device-integrated touch screen panel according to claim 13, wherein the window substrate comprises at least one of Polymethyl Methacrylate, (PMMA), acryl, or polyester (PET).

18. The display device-integrated touch screen panel according to claim 17, wherein the display device-integrated touch screen panel is flexible.

* * * * *